United States Patent
Sugaya (10) Patent No.: US 8,799,398 B2
(45) Date of Patent: Aug. 5, 2014

(54) REMOTE SYSTEM AND REMOTE OPERATION METHOD FOR TERMINAL

(75) Inventor: Shunji Sugaya, Tokyo (JP)

(73) Assignee: OPTiM Corporation, Saga (JP)

(*) Notice: Subject to any disclaimer, the term of this patent is extended or adjusted under 35 U.S.C. 154(b) by 484 days.

(21) Appl. No.: 13/156,905

(22) Filed: Jun. 9, 2011

(65) Prior Publication Data
US 2012/0303741 A1 Nov. 29, 2012

(30) Foreign Application Priority Data
May 25, 2011 (JP) .................................. 2011-117208

(51) Int. Cl.
*G06F 15/167* (2006.01)
*G06F 15/16* (2006.01)

(52) U.S. Cl.
USPC .......................................... 709/214; 709/206

(58) Field of Classification Search
USPC ........................................................ 709/214
See application file for complete search history.

(56) References Cited

U.S. PATENT DOCUMENTS

2008/0208966 A1* 8/2008 Edwards et al. ............... 709/203
2009/0089353 A1* 4/2009 Fukuta et al. .................. 709/201

FOREIGN PATENT DOCUMENTS

JP 2003006062 A 1/2003
KR 20030086766 A 11/2003

* cited by examiner

*Primary Examiner* — Shaq Taha
(74) *Attorney, Agent, or Firm* — BainwoodHuang (57) ABSTRACT

A remote system and a remote operation method are provided, being capable of starting promptly and completing remote operation immediately for a user. A support server 100 acquires configuration information of a user terminal 10 in response to support request from the user terminal 10, receives remote operation from a supporter, the operation corresponding to support request sent from a support terminal 150, and sends remote operation received from the supporter to the user terminal 10 as a configuration command for setting configuration corresponding to the support request from the user terminal 10. The user terminal 10 sets configuration corresponding to the support request based on sent configuration command. Where the user terminal 10 conducts configuration corresponding to the support request based on the sent configuration command, the user terminal 10 displays a user interface in a phased manner to set the configuration corresponding to remote request.

15 Claims, 8 Drawing Sheets

<CONFIGURATION COMMAND CORRESPONDENCE TABLE>

| CONFIGURATION OPERATION | CONFIGURATION COMMAND | PHASE DISPLAY DATA |
|---|---|---|
| [VOLUME CHANGE OPERATION] RING VOLUME CHANGE OPERATION Volume 15 | [RING VOLUME CHANGE COMMAND 1] import CallSound.cfg copy CallSoundnew.cfg | [RING VOLUME CHANGE SCENARIO 1] 1. DISPLAY CONFIGURATION WINDOW 2. SELECT SOUND CONFIGURATION |
| : | : | : |

Fig. 5

<PHASE DISPLAY PROCESS OF USER INTERFACE>

Fig.9
<SCREEN INFORMATION ANALYTICAL PROCESS>

Fig.10
<IMAGE ID CORRESPONDENCE TABLE>

<IMAGE ID-CHARACTER STRING CORRESPONDENCE TABLE>

| IMAGE ID | CHARACTERS | CORRESPONDENCE IMAGE DATA |
|---|---|---|
| 001 002 | [CONFIGURATION][WIRELESS AND NETWORK][SOUND CONFIGRATION] | Sound1.png |
| 002 | [SOUND CONFIGURATION][MANNER MODE][VIBRATE MODE] | Sound2.png |
| 001 | [WIRELESS AND NETWORK][SSID] | Network1.png |
| : | : | : |

Fig.13

<ICON IMAGE ACQUISITION-SET-IN PROCESS>

Fig.14

Fig.15

REMOTE SYSTEM AND REMOTE OPERATION METHOD FOR TERMINAL

This application is based on and claims the benefit of priority from Japanese Patent Application No. 2011-117208, filed on 25 May 2011, the content of which is incorporated herein by reference.

TECHNICAL FIELD

The present invention relates to a remote system and a remote operation method that remotely operate a user's terminal connected through a public line network.

BACKGROUND ART

In recent years, various services have been provided for users by connecting portable terminals connected with a web server and the like through a public line network. In particular, advanced services, which have been provided for personal computers conventionally, has become possible to provide for mobile phones by the appearance of smart phones (highly functional mobile phones).

In addition to services provided from servers, smart phones themselves have various functions. However, it often takes time for users to become familiar with all the functions. For example, even if a smart phone has functions as a user desires, the problem where the user cannot utilize the functions has been presented because the user is not sure how to set up the functions.

Then, in order to maximize the use of such advanced web services and the high functionality of a smart phone, users need to know the operation of configuration and the functions of a smart phone. In addition, if users who are not used to operation configuring their own terminals for the first time, configuration information that should not be deleted may be actually deleted, or inappropriate configuration may be set to cause an error.

For approaching such problems, there has been a known method of remotely supporting (maintaining) a user's terminal from a system to remotely configure the user's terminal and to remotely guide the user of the terminal. For example, the patent document 1 discloses that a server side requires the screen information of each client to be supported and constantly displays a list of this screen information on the server to promote the efficiency of supporting and monitoring a client.

CITATION LIST PATENT LITERATURE

Patent document 1: Japanese Unexamined Patent Application 2003-006062

In addition, it is known that remote operation is conducted by remotely logging, etc. into a user terminal that receives support, from a terminal that conducts remote support and sharing a screen in real time,
Specifically, a support terminal is operated, sequentially forwarding and displaying screens that are being displayed on a user terminal. This enables input operation (remote operation) as if the user terminal is operated.

However, a remote system that shares a screen in real time requires to sequentially send changing screen information data to the other side and has a large amount of data necessary for the communication. Therefore, a sufficient service cannot be provided with little capacity of the communication band. In addition, this remote system has a large amount of data to be processed. This may cause delay in start of a remote service or take a long time to complete remote operation. For a user, it is desired that a remote support service be provided in a short time and that remote operation be smoothly conducted.

SUMMARY OF INVENTION

An objective of the present invention is to provide a remote system and a remote operation method, being capable of starting a remote service promptly and completing remote operation immediately for a user.

According to a first aspect of the present invention, a remote system includes: a terminal; a remote terminal remotely operating the terminal; and a remote server. In the remote system,
the remote server includes
a data acquisition module acquiring data on the remote request in response to a remote request from the terminal, the data being stored in the terminal, and notifying the remote terminal,
the remote terminal includes
an operation receiving module receiving remote operation from a remote operator, the remote operation corresponding to remote request sent from the terminal, and sending the remote operation to the remote server, and
the remote server also includes
a command sending module sending remote operation received from the remote operator to the terminal, as a command for conducting not remote operation by sharing a screen from the remote terminal to the terminal but operation corresponding to remote request from the terminal.

According to the first aspect of the present invention, the remote server acquires data on the remote request in response to remote request from the terminal, the data being stored in the terminal, and notifies the remote terminal. The remote terminal receives remote operation from a remote operator, the remote operation corresponding to remote request sent from the terminal, and sending the remote operation to the remote server. The remote server also sends remote operation received from the remote operator to the terminal, as a command for conducting not remote operation by sharing a screen from the remote terminal to the terminal but operation corresponding to remote request from the terminal.

Therefore, a command that conducts operation corresponding to remote operation achieves the remote system, which achieves a remote system without sharing a screen in real time. According to this remote system, the amount of data processing is reduced, leading the load of each terminal and the data traffic to decrease, so as to start a remote support service promptly and complete remote operation immediately for a user.

The first aspect of the present invention is a category of a remote system, but the categories of a remote operation method and a program of the same have similar functions and effects.

According to the second aspect of the present invention, in the remote system according to the first aspect of the present invention, the terminal includes
a phase display module displaying, where remote operator's remote operation corresponding to the remote request is reflected in the terminal based on a command sent from the command sending module, a user interface to help a user who operates the terminal to conduct operation corresponding to the remote request by her or himself, in a phased manner on the terminal.

According to the second aspect of the present invention, the remote server acquiring data in response to remote request from the terminal, the data being stored in the terminal, and the remote terminal receives remote operation from a remote operator, the remote operation corresponding to remote request sent from the terminal. The remote server also sends operation received from the remote operation to the terminal, as a command for conducting operation corresponding to remote request from the terminal. The terminal displays a user interface to help a user who operates the terminal to conduct operation corresponding to the remote request by her or himself, in a phased manner on the terminal, where remote operator's operation corresponding to the remote request is reflected in the terminal based on this sent command.

As a problem, in the first aspect of the present invention, the method of executing a command by merely sending the command from a server to a user terminal leads the execution to terminate without user's awareness of the operation method. For example, when it is a command related to configuration of the terminal, a user has no chance to learn the configuration operation method. In this case, the user cannot set the configuration by her or himself, when the user attempts to set a similar configuration again. Furthermore, multiple phased operations may be required to reach only one configuration to a user terminal. In this case, the user has to understand all of these phased operations to complete configuration.

In the second aspect of the present invention, the remote server receives remote request from the terminal, complete to reflect the remotely requested operation by a command corresponding to this remote request, displays a user interface in a phased manner for setting this configuration the terminal, thereby enabling a user who operates the terminal to learn how to conduct the remotely requested operation. Especially, when the operating system (hereinafter referred to as "OS") of a plurality of terminals are the same, the command itself for setting by remote operation may be the same even if the manufacturer of the terminal of which is different. However, only screen information to be displayed may vary from the manufacturer of the terminal. The second aspect of the present invention is effective for this case.

The second aspect of the present invention is a category of a remote system, but the categories of a remote operation method and a program of the same have similar functions and effects.

According to the third aspect of the present invention, in the remote system according to the first aspect of the present invention, the remote server includes a screen information acquisition module acquiring at least any one of an image ID and a character from the terminal, the image ID and the character, both corresponding to screen information of the terminal, and a terminal information output module displaying an image corresponding to any one of the acquired image ID and the acquired character on the remote terminal.

According to the third aspect of the present invention, the remote server acquires at least any one of an image ID and a character from the terminal, the image ID and the character, both corresponding to screen information of the terminal and displays an image corresponding to at least any one of the acquired image ID and the acquired character on the remote terminal.

Therefore, the remote server can display screen information of the terminal on the remote terminal. In this case, the screen information itself of the terminal is not sent and received, but display process of a correspondence image is executed by sending and receiving an image ID and a character. This leads data traffic between the terminal and the remote server to be reduced so that support time loss can be avoided. Thus, the simulation of real-time screen sharing can be conducted. Even in the situation of this reduced data traffic, the remote terminal side can check whether or not the phase display of a user interface that has been displayed on the terminal in a phased manner is performed.

The third aspect of the present invention is a category of a remote system, but the categories of a remote operation method and a program of the same have similar functions and effects.

According to a fourth aspect of the present invention, in the remote system according to the third aspect of the present invention, where the screen information acquisition module cannot acquire an image ID corresponding to screen information of the terminal, an image itself corresponding to an image ID that cannot be acquired is acquired from the terminal, and the terminal information output module uses pattern data preliminarily stored in a remote server and an image acquired from the terminal to display an image corresponding to screen information of the terminal on the remote terminal.

According to a fourth aspect of the present invention, where the screen information acquisition module cannot acquire an image ID corresponding to screen information of the terminal, an image itself corresponding to an image ID that cannot be acquired is acquired from the terminal, and pattern data preliminarily stored in a remote server and an image acquired from the terminal are used to display an image corresponding to screen information of the terminal on the remote terminal.

Therefore, for example, even if an image ID is not registered in the support server 100 for a new terminal, an image itself that is being displayed on the terminal can be acquired and displayed on the remote terminal.

The fourth aspect of the present invention is a category of a remote system, but the categories of a remote operation method and a program of the same have similar functions and effects.

According to the fifth aspect of the present invention, in the remote system according to the first aspect of the present invention, the terminal includes an screen information sending module sequentially sending image data of a screen shot to the remote server, the screen shot being displayed on the terminal, the remote server includes a screen information forwarding module receiving the sent image data and forwarding the image data to the remote terminal, and at a predetermined time, by starting the screen information sending module and the screen information forwarding module, and by sharing an screen in real time from the remote terminal to the terminal, a full remote system conducting remote operation is executed to stop a process of the command sending module.

According to the fifth aspect of the present invention, the terminal sequentially sends image data of a screen shot to the remote server, the screen shot being displayed on the terminal, the remote server receives the sent image data and forwarding the image data to the remote terminal, and at a predetermined time, the screen information sending module and the screen information forwarding module switch over to the full remote system.

Therefore, according to a data communication situation or the like of the remote system, the remote service can be provided by switching over to the full remote system that shares a screen in real time.

The fifth aspect of the present invention is a category of a remote system, but the categories of a remote operation method and a program of the same have similar functions and effects.

According to the sixth aspect of the present invention, the remote system according to the first aspect of the present invention further includes a logging module, where the operation receiving module detects remote operation for preliminarily associated prohibition data or prohibited remote operation, logging the remote operation in the remote terminal or the remote server.

According to the sixth aspect of the present invention, where remote operation for preliminarily associated prohibition data or prohibited remote operation is detected, the remote operation is logged in the remote terminal or the remote server.

Therefore, when data is improperly operated through remote operation or in the case of erroneous operation, a log can be logged.

The sixth aspect of the present invention is a category of a remote system, but the categories of a remote operation method and a program of the same have similar functions and effects.

According to a seventh aspect of the present invention, in the remote system according to the second aspect of the present invention, the configuration phase display module includes a redisplay module redisplaying the user interface that was displayed in a phased manner in response to user's operation of the terminal.

Accordingly, a user who owns a terminal can redisplay the user interface that was displayed in a phased manner before.

The seventh aspect of the present invention is a category of a remote system, but the categories of a remote operation method and a program of the same have similar functions and effects.

The present invention can provide a remote system and a remote operation method, being capable of starting a remote service promptly and completing remote operation immediately for a user.

DESCRIPTION OF EMBODIMENTS

Hereinafter, a best mode of the present invention will be described with reference to attached drawings. However, this is illustrative only, and the scope of the present invention is not limited thereto.

An example of applying a quick remote system to a remote support system will be explained hereinafter as a preferred embodiment of the present invention. In the present invention, an example where remote operation of a user terminal 10 is used for remote support to the user terminal 10 will be explained. Generally, the support server as described hereinafter may be a remote server. The support terminal may be a remote terminal. The configuration command as described hereinafter may be a general command which is not limited to any configuration. Generally, the support request may be a remote request.

Quick System Configuration

Figure 1:
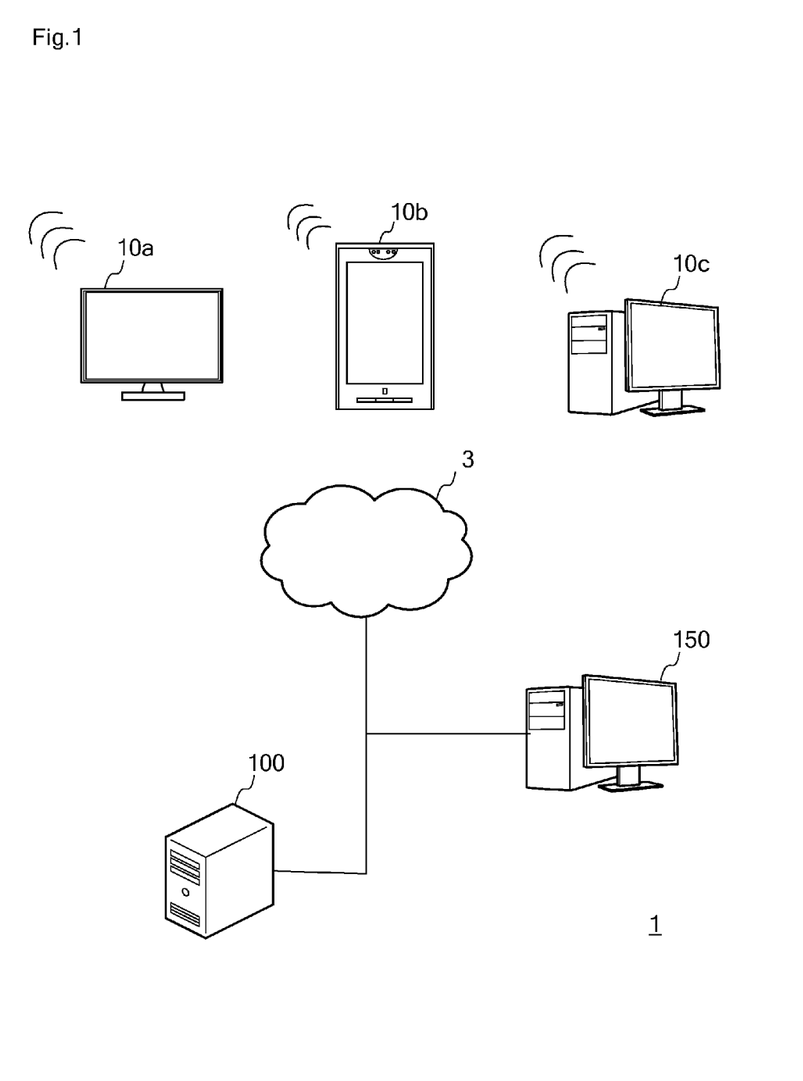
FIG. 1 is a schematic diagram of a quick remote system 1.

FIG. 1 is a system configuration diagram of a quick remote system 1 that is a preferred embodiment of the present invention. The quick remote system 1 is composed of user terminals 10a-10c (hereinafter simply put "a user terminal 10" in the place of "user terminals 10a-10c"), a support server 100, a public line network 3 (such as Internet networks, a third generation communication network, and a fourth generation communication network), and a support terminal 150.

The user terminal 10 is communicatably connected with the support server 100 through the public line network 3. The support server 100 and the support terminal 150 may be connected through a local area network (hereinafter referred to as "LAN") or through the public line network 3. The communication in the quick remote system 1 may not be wireless communication nor wire communication. The user terminal 10 may be communicatably connected with the public line network 3 through a network device such as a router.

The user terminal 10 may be a general information terminal for which a user receives support, which is an information device or an electrical appliance with functions described hereinafter. For example, the user terminal 10 may be a mobile phone, a smart phone 10b, a complex printer, a television 10a, networking equipment such as a router or a gateway, and a computer 10c. The user terminal 10 may also be white goods such as a refrigerator and a washing machine. The user terminal 10 may also be general information appliances such as a telephone, a netbook terminal, a slate terminal, an electronic book terminal, an electronic dictionary terminal, a portable music player, and a portable player capable of recording and playing back content.

The support terminal 150 is a general information terminal that is used by a supporter to support the user terminal 10.

Generally, the support terminal 150 shares a screen with the user terminal 10 in real time and conducts remote operation in order to conduct the remote support. Specifically, screen information, which becomes a screen shot that is being displayed on the user terminal 10, is displayed on the support terminal 150. The remote operation of this screen information from the support terminal 150 is reflected directly in the user terminal 10. This remote system corresponds to the full remote system as describes hereinafter. However, the quick remote system 1 (hereinafter conveniently referred to as "quick remote") is the remote system that does not conduct remote operation in real time by screen sharing.

Functions

Figure 2:
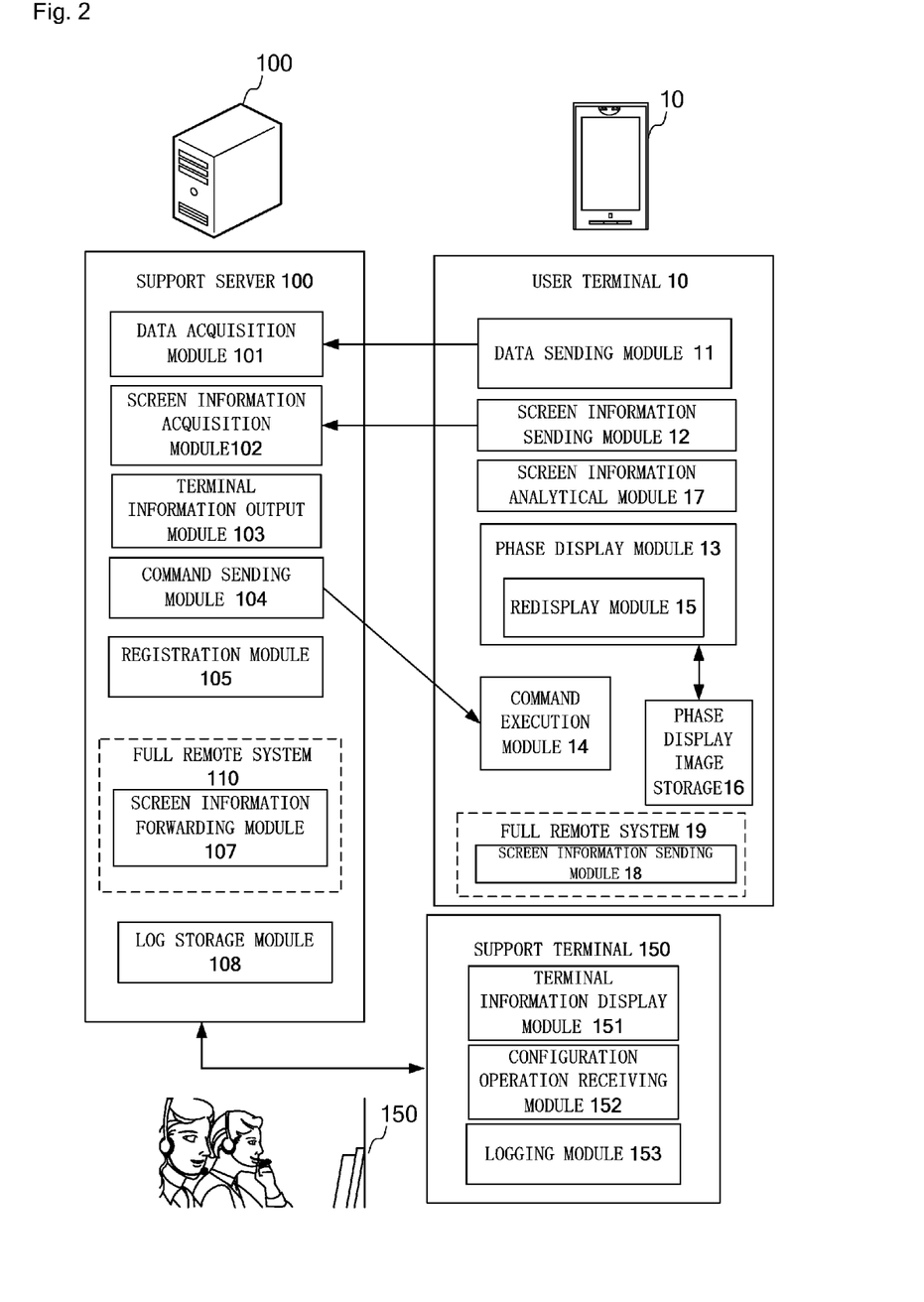
FIG. 2 is a functional block diagram of a support server 100, a user terminal 10, and a support terminal 150.

FIG. 2 illustrates the relationship among the respective functions of a support terminal 150, a support server 100, and a user terminal 10.

The user terminal 10 and the support terminal 150 include a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11, a wireless device complying with the IMT-2000 standard such as the third generation mobile communication system, or the like. The communication unit may include a wired device for LAN connection.

The user terminal 10 and the support terminal 150 also include a display unit outputting and displaying data and images that have been controlled by the control unit as an output unit; and a touch panel, a keyboard, a mouse, and the like that receive input from a user and a supporter as an input unit. The user terminal 10 and the support terminal 150 also include a data storage unit as a memory unit such as a hard disk or a semiconductor memory.

In the user terminal 10, the control unit cooperates with the communication unit, the output unit, the input unit, and the memory unit by reading a predetermined program of an application layer to achieve a data sending module 11, a screen information sending module 12, a phase display module 13, a command execution module 14, a redisplay module 15, and a screen information analytical module 17. A part of the memory unit of the user terminal achieves phase display image storage 16. The specific function of each module will be described with reference to FIG. 3.

In the support terminal 150, the control unit reads a predetermined program of a predetermined application layer and cooperates with the communication unit, the output unit, the input unit, and the memory unit to achieve a terminal information display module 151 and a configuration operation receiving module 152. The specific function of each module will be described with reference to FIG. 3.

The support server 100 includes a control unit including a central processing unit (hereinafter referred to as "CPU"), a random access memory (hereinafter referred to as "RAM"), and a read only memory (hereinafter referred to as "ROM"), and the like; and a communication unit including Wireless Fidelity® or WiFi® enabled device complying with, for example, IEEE802.11. The support server 100 also includes a data storage unit as a memory unit such as a hard disk or a semiconductor memory.

The control unit of the support server 100 cooperates with the communication unit and the memory unit by reading a predetermined program of a predetermined application layer to achieve a data acquisition module 101, a screen information acquisition module 102, a terminal information output module 103, a command sending module 104, a registration module 105, and a logging module 108. The function of each of these modules will be described hereinafter.

Remote Support Process

Figure 3:
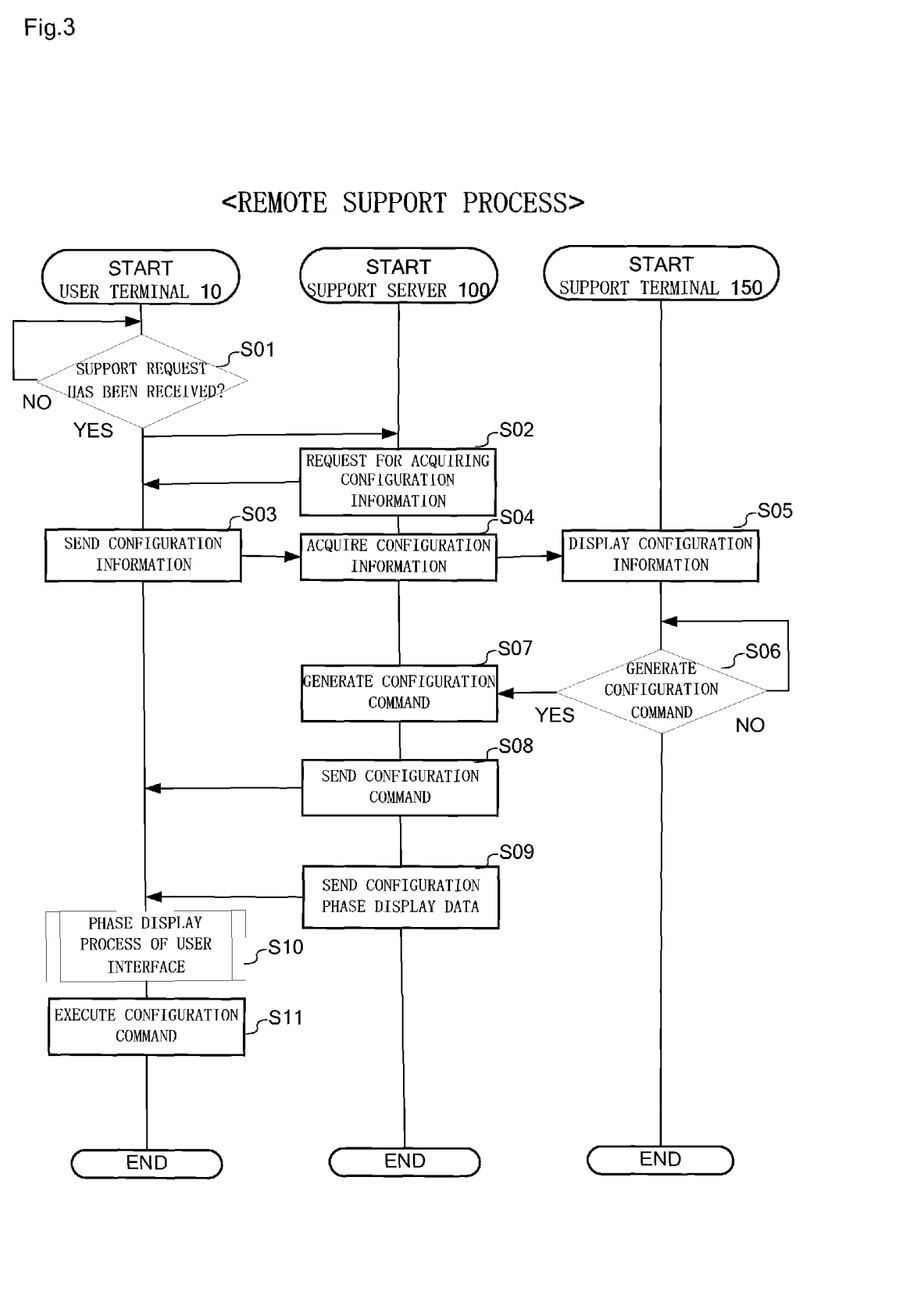
FIG. 3 is a flow chart diagram illustrating a remote support process that is executed by the support server 100, the user terminal 10, and the support terminal 150.

FIG. 3 is a flow chart diagram of a remote support process that is executed by the user terminal 10, the support server 100, and the support terminal 150.

The user terminal 10 receives operation that a user requested for support (Step S01). In the user terminal 10, an application for receiving remote support is installed and for example, receives operation for starting this application from a user.

If the user terminal 10 receives operation that a user requested for support (Step S01: "Yes"), the user terminal 10 connects with the support server 100, notifies the support server 100 of support request, and proceeds to the step S02. If the user terminal 10 does not receives operation that a user requested for support (Step S01: "NO"), the step S01 is repeated.

Next, the data acquisition module 101 of the support server 100 requests to acquire the configuration information of the user terminal 10 (Step S02).

Figure 6:
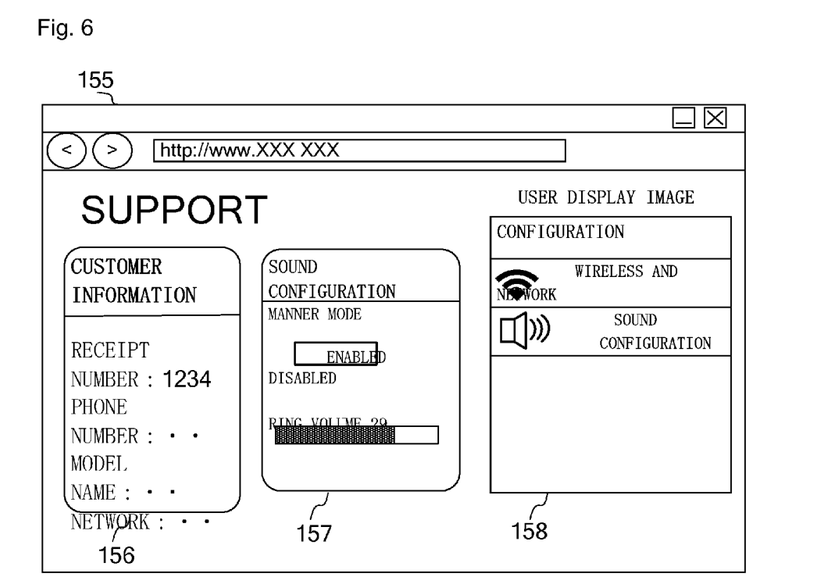
FIG. 6 illustrates a screen image displayed on the support terminal 150.

The configuration information is data that is set as data in the user terminal 10 as software and hardware. The support server 100 does not need to request for acquiring all the configuration information stored in the user terminal 10. The configuration information acquired by the support server 100 may be predetermined in the support server 100 with respect to each user terminal 10. As one example of configuration information that is set as software shown in FIG. 6, in the support screen 155 displayed on the support terminal 150, the manner mode of the sound configuration is enabled, and the ring volume is set to "29." In addition to configuration information, the support server may request for acquiring customer information (a telephone number, the model name of a terminal, and a network) as shown in FIG. 6.

In response to this request, the data sending module 11 of the user terminal 10 sends the required configuration information to the support server 100 (Step S03).

The data acquisition module 101 of the support server 100 receives and acquires the configuration information sent from the user terminal 10 (Step S04). The support server 100 selects a support terminal 150 to notify the selected support terminal 150 that support request has been received and that the configuration information of the user terminal 10 has been acquired.

In response to this notification, the terminal information display module 151 of the selected support terminal 150 accesses the support server 100 in response to operation from a supporter. Then, the terminal information output module 103 of the support server 100 displays the configuration information on the support terminal 150 (Step S05). As one example, the support screen 155 shown in FIG. 6 is displayed on the support terminal 150.

Next, the configuration operation receiving module 152 of the support terminal 150 receives configuration operation (remote operation) from a supporter (Step S06). The configuration operation is to be a solution to support request of a user. If configuration operation is received from a supporter (Step S06: "YES"), the configuration operation is sent to support server 100, and the process proceeds to the step S07. If a configuration operation is not received from a supporter (Step S06: "NO"), the process waits for input from a supporter, and the step S06 is repeated.

When the command sending module 104 of the support server 100 receives configuration operation from the support terminal 150, generates a configuration command corresponding to the configuration operation (Step S07), and sends the generated configuration command to the user terminal 10 (Step S08). Then, the process proceeds to the step S09.

The configuration command is a command for making the support server 100 set configuration requested for support in the user terminal 10. For example, when the sound configuration of the user terminal 10 is set, being written in a predetermined configuration file, the sound configuration is changed by updating this configuration file to configuration as a user desires. In this case, the support server 100 sends a predetermined command to replace the configuration file stored in the user terminal 10 or to change the content of the configuration file. This sent predetermined command is the configuration command.

Figure 4:
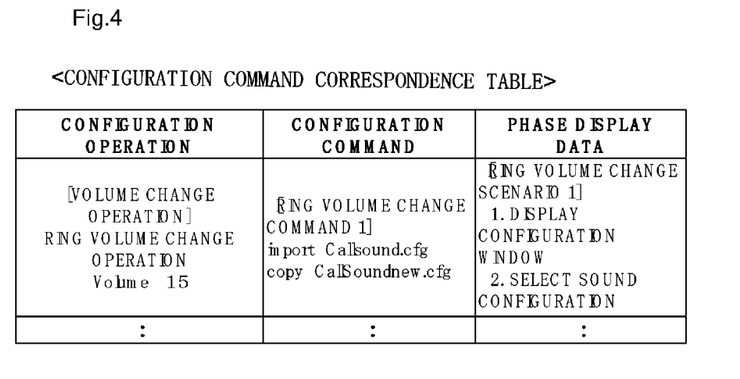
FIG. 4 illustrates a configuration command correspondence table.

As shown in the configuration command correspondence table of FIG. 4, configuration operation received from the support terminal 150 and a configuration command to be generated are preliminarily associated and stored in the support server 100. The configuration command may be a command in the configuration command correspondence table. The configuration command may be generated, including a character and values that are input from the support terminal 150 in the configuration command correspondence table. In the example of FIG. 4, the configuration operation is "VOLUME CHANGE OPERATION" to set the ring volume "Volume 15". In this case, the correspondence configuration command is the ring volume command 1.

Next, the support server 100 sends the configuration phase display data to the user terminal 10 (Step S09). The phase display module 13 of the user terminal 10 receives the configuration phase display data sent from the support server 100, stores the received configuration phase display data in the phase display image storage 16, and executes the user interface phase display process (Step S10).

The configuration phase display data is data on a user interface that is displayed on the user terminal 10 in a phased manner when a user operates the user terminal 10 to set configuration requested for support by her or himself. In other words, the configuration phase display data is composed of scenario data that displays this user interface on the user terminal 10 in a phased manner; and a command for executing this scenario data.

The scenario data is data that defines an agreement: in order to operate the user terminal 10 by her or himself to set configuration that a user requested for support, which user interface is displayed in which order, and what operation shifts to the next user interface on the user terminal 10. In the example of FIG. 4, the configuration phase display data is the ring volume scenario 1, in which a configuration window is displayed first, and then sound configuration is selected and displayed, and the like. The configuration phase display data includes a command for making the user terminal 10 execute this scenario data.

The configuration phase display data is preliminarily associated with configuration operation and a configuration command as shown in the configuration command correspondence table of FIG. 4. Accordingly, the support server 100 determines the configuration phase display data if the configuration operation and the configuration command are determined. In the example of FIG. 4, the configuration phase display data corresponding to the configuration command "ring volume command 1" is "ring volume scenario 1.

Next, the command execution module 14 of the user terminal 10 executes the configuration command received from the support server 100 (Step S11). In other words, the command execution module 14 can actually set the configuration item requested for support by executing a configuration command received from the support server 100. In the example of FIG. 4, the ring volume of the user terminal 10 can be set to "Volume 15".

Therefore, in the quick remote system 1, it is possible to promptly conduct remote operation from the support terminal 150 not by processing operation data on remote operation itself through remote login or the like but by using a command corresponding to remote operation.

Phase Display Process of User Interface

Figure 5:
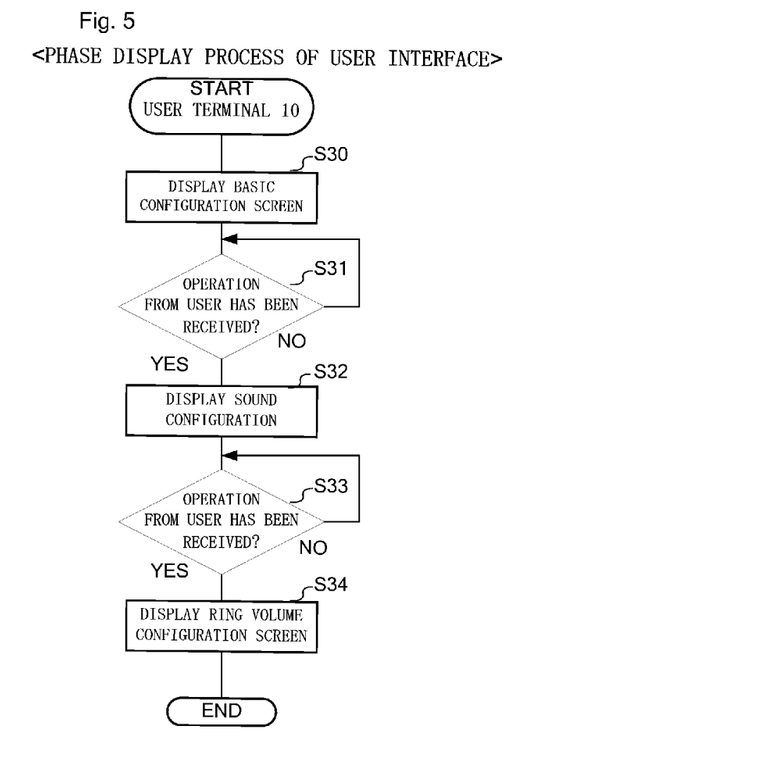
FIG. 5 is a flow chart diagram illustrating the user interface phase display process that is executed by the user terminal 10.
Figure 7:
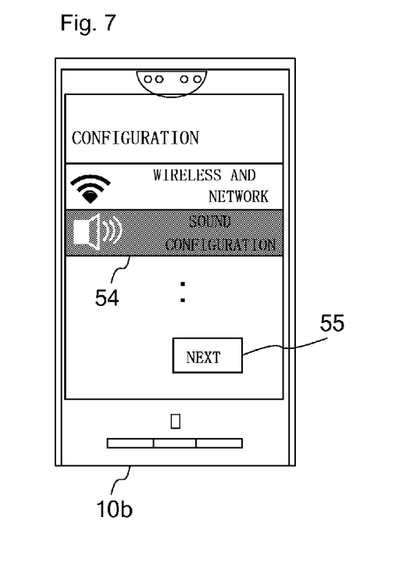
FIG. 7 is a screen image (basic configuration setup screen) displayed on the user terminal 10.
Figure 8:
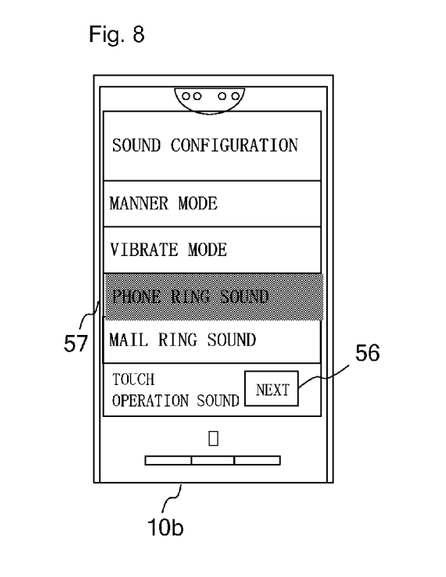
FIG. 8 is a screen image (sound setup screen) displayed on the user terminal 10.

Based on FIGS. 5, 7, and 8, the phase display process of a user interface that is executed by the phase display module 13 of the user terminal 10 and corresponds to the step S10. The phase display module 13 displays a message on the display unit of the user terminal 10 in the sense that the phase display of a user interface for configuration requested for support starts and then receives operation for allowing phase display to start. The process of the step S30 is started in response to operation for starting phase display from this user.

The phase display module 13 executes the phase display process of a user interface based on a scenario data of the configuration phase display data. The scenario data of FIG. 5 is a scenario that sets the ring volume of the user terminal 10. This scenario is composed of three-phased image display (a basic configuration screen, a sound configuration screen, and a ring tone configuration screen). The scenario is not necessary to be composed of three phases, but the number of screen structures that are required for completion of the configuration becomes the number of phases. In this case, the message "The ring volume configuration is to be demonstrated. Please tap the screen." or the like may be displayed first on the display unit of the user terminal 10.

First, the phase display module 13 displays the basic configuration screen (Step S30). The basic configuration screen is a screen as shown in FIG. 7, for setting basic configuration such as the (wireless and network) communication configuration, the sound configuration, the mail configuration, and the application configuration or the like of the user terminal 10

On the basic configuration screen, an operation item that a user should operate may be highlighted. Specifically, as shown in FIG. 7, the scenario is "RING VOLUME CONFIGURATION", so that "SOUND CONFIGURATION 54" may be highlighted as an icon that the user should operate.

Next, the phase display module 13 shifts to waiting for operation from a user (Step S31). For example, as shown in FIG. 7, if the icon 55 is operated (Step S31:"YES"), the process proceeds to the step S32 to display a user interface of the next phase. The process is waiting otherwise until the icon 55 is operated (Step S31:"NO").

Next, as a second phase, the phase display module 13 displays the sound configuration screen (Step S32). The sound configuration screen is a screen that set configuration related to the sound of the user terminal 10 as shown in FIG. 8. When a user selects and operates the sound configuration item of the user terminal 10 on the basic configuration screen, the sound configuration screen is usually displayed. On the sound configuration screen, an operation item that a user should operate may be highlighted. Specifically, as shown in FIG. 8, the scenario is "RING VOLUME CONFIGURATION", so that "PHONE RING SOUND 57" may be highlighted as an icon that the user should operate.

Next, the phase display module 13 shifts to waiting for operation from a user again (Step S33). For example, as shown in FIG. 8, if the icon 55 is operated (Step S33:"YES"), the process proceeds to the step S34 to display a user interface of the next phase. The process is waiting otherwise until the icon 55 is operated (Step S33:"NO").

Next, as a third phase, the phase display module 13 displays the phone ring sound configuration screen (Step S34). The phone ring sound configuration screen is a screen that sets phone ring sound. A user usually operates this screen so as to change the ring volume of the user terminal 10, but this is not shown in figures. Even though configuration is actually not set to change the ring volume of the user terminal 10 at this point, the user interface for changing configuration is displayed in a phased manner until change of the configuration is completed.

The process proceeds to the next step if operation is received from a user in the steps S31 and S33. However, for example, the process may proceed to the next step after a predetermined time passes without receiving operation from a user.

Redisplay of Configuration Phase Display Data

As described above, the configuration phase display data is not be displayed on the user terminal 10 only at the time when a configuration command is sent from the support server 100, and then the configuration is executed for the user terminal 10. However, the once-received configuration phase display data may be stored in phase display image storage and may be redisplayably composed in response to display request from a user. In this case, the redisplay module 15 receives operation requested for redisplay from a user, reads out the configuration phase display data stored in the phase display image storage, and redisplays the user interface that has been displayed in a phased manner.

Screen Information Analytical Process

Figure 9:
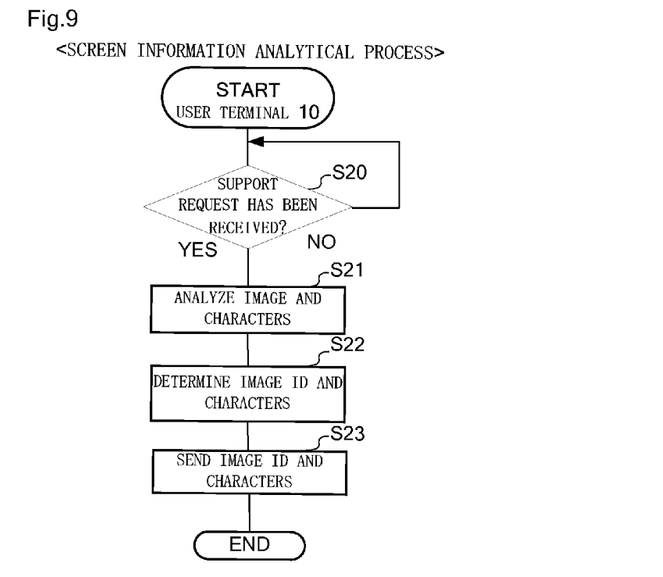
FIG. 9 is a flow chart diagram illustrating a screen information analytical process that is executed by the user terminal 10.

During the remote support process from the step S02 to S05, is executed by the user terminal 10 the screen information analytical process of FIG. 9. In other words, like the step S01, if the user terminal 10 determines that a support request has been received (Step S20:"YES"), the process proceeds to the step S21. The process is waiting otherwise until receiving support request (Step S20:"NO").

Screen information is an entire screen image that is being displayed on the user terminal 10 in principle. For example, when the screen image exists in excess of the region of the display unit of the user terminal 10 (i.e. when the region displayed by scrolling the screen of the user terminal 10 exists), the screen information includes a part in excess of the region of the display unit.

The screen information analytical module 17 of the user terminal 10 analyzes images and a character that are currently being displayed on the display unit of the user terminal 10 (Step S21). First, the screen information analytical module 17 extracts the character being displayed on the display unit.

Figure 10:
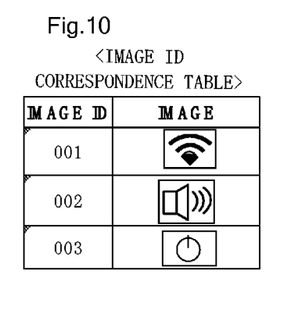
FIG. 10 illustrates an image ID correspondence table.

The image ID correspondence table shown in FIG. 10 is preliminarily stored in the user terminal 10. Specifically, the image ID correspondence table is a table in which an icon image displayed on the display unit of the user terminal 10 is associated with an image ID. Referring to this image ID correspondence table, the screen information analytical module 17 determines whether or not the images that are currently displayed on the display unit include an icon image corresponding to an image ID. As a result, the screen information analytical module 17 determines the extracted character; and the image ID corresponding to the icon image that exists on the screen (Step S22).

The image ID correspondence table is stored only in the support server 100. When the screen information analytical process starts, the image ID correspondence table may be downloaded from the support server 100 to the user terminal 10 and stored in the user terminal 10.

Next, the screen information sending module 12 sends the determined image ID and character to the support server 100 (Step S23).

Figure 11:
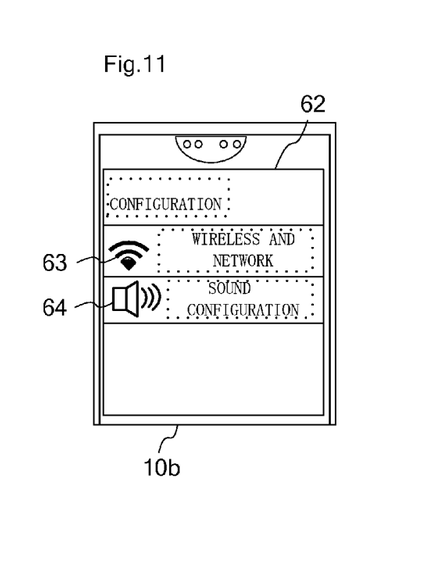
FIG. 11 illustrates screen information displayed on the user terminal 10.

As an example, in the case where the screen information 62 of FIG. 11 is displayed on the display unit of the user terminal 10, the above-mentioned process will be explained. The screen information analytical module 17 extracts "CONFIGURATION", "WIRELESS AND NETWORK", and "SOUND CONFIGURATION" by retrieving the character. Then, the screen information analytical module 17 refers to the image ID correspondence table shown in FIG. 10 and determines that icon images respectively associated with the image IDs "001" and "002" exist. Finally, the screen information analytical module 17 determines the character "CONFIGURATION", "WIRELESS AND NETWORK", and "SOUND CONFIGURATION", the image IDs "001" and "002" and sends these data to the support server 100.

Figure 12:
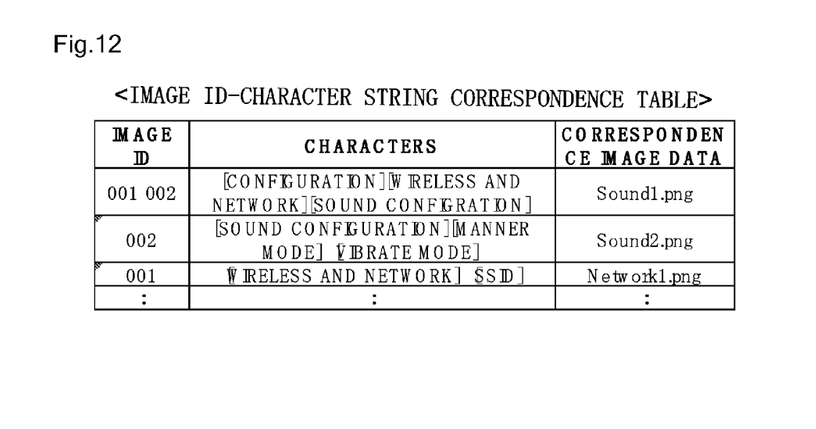
FIG. 12 illustrates an image ID-character string correspondence table.

On the other hand, the screen information acquisition module 102 of the support server 100 refers to the image ID-character string correspondence table as shown FIG. 12 and determines the correspondence image data associated with the acquired image ID and character. As an example of this case, the character string "CONFIGURATION", "WIRELESS AND NETWORK", and "SOUND CONFIGURATION" are determined. In the image IDs are "001" and "002", the correspondence image data is "Sound1.png".

The correspondence data is image data corresponding to the entire screen image that is being displayed on the user terminal 10 in principle. For example, when the screen image exists in excess of the region of the display unit of the user terminal 10 (i.e. when the region displayed by scrolling the screen of the user terminal 10 exists), the image data includes a part in excess of the region of the display unit.

The terminal information output module 103 of the support server 100 displays the determined correspondence image data on the support terminal 150 in response to request from the support terminal 150. As shown in the example of FIG. 6, the same image as the screen information 62 that is being displayed in the user terminal 10 is displayed on a part of the user screen image 158 of the support terminal 150

Thus, a supporter can understand screen information that a user is viewing.

The screen information analytical process starts at the time of support request in the step S20. However, whenever screen information displayed on the display unit of the user terminal 10 is updated, the process from the step S21 to the step S23 is executed. As a result, the same image as the screen information that is being displayed on the user terminal 10 is displayed on the support terminal 150.

For the image ID correspondence table stored in the user terminal 10 and the image ID-character string correspondence table, various tables are provided with respect to each model of the user terminals 10. In other words, in the configuration information in the step S04 of the remote support process, the support server 100 acquires the model name of the user terminal 10. Then, the support server 100 refers to the image ID-character string correspondence table based on this acquired model name and determines the correspondence image data.

In the above-mentioned description, one correspondence image data has been determined from both of the character and the image ID. However, one correspondence image data may be determined from either of the character and the image ID.

When the screen information of the user terminal 10 is displayed on the support terminal 150, it is not limited to the display method using an image ID as described above. The image data that is being displayed on the user terminal 10 may be sequentially sent to the support terminal 150 by a real-time screen sharing and then displayed on the support terminal 150. In other words, because the remote operation is conducted by a command in a pseudo manner, the remote operation is not conducted in the full remote as described hereinafter. However, the support terminal 150 may share only the screen of the user terminal 10.

Icon Image Acquisition-set-in Process

When the correspondence image data is not stored in the support server 100, the screen information that is being displayed on the user terminal 10 cannot be displayed on the support terminal 150. In addition, when an icon image that does not exist in the image ID correspondence table is being displayed on the user terminal 10, the screen information that is being displayed on the user terminal 10 cannot be displayed on the support terminal 150. Then, in the following description, a method of displaying screen information on the support terminal 150, if the correspondence image data is not stored in the support server 100, or even if an icon image that is not registered in an image ID is being displayed on the user terminal 10 will be explained with reference to FIG. 13.

Figure 13:
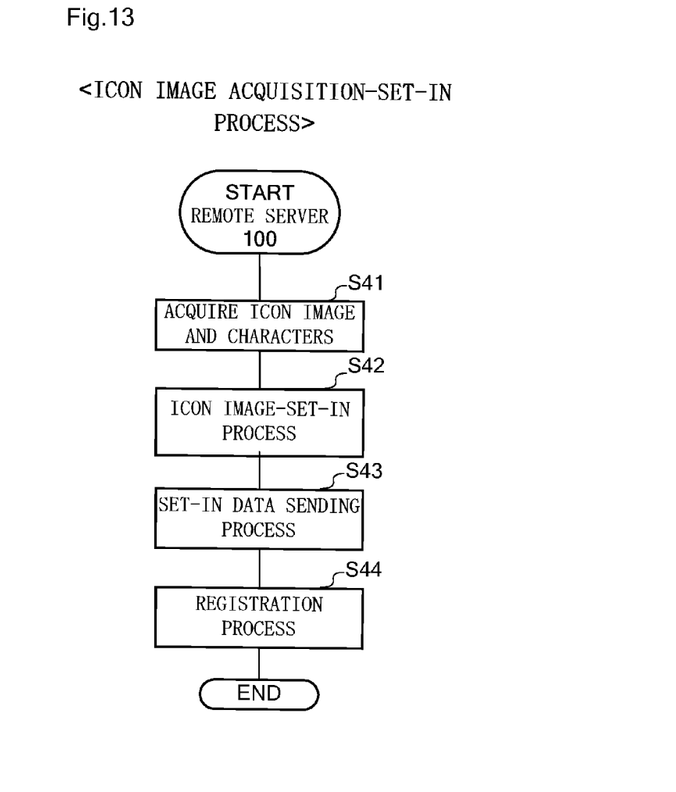
FIG. 13 is a flow chart diagram illustrating an icon image acquisition-set-in process that is executed by the user terminal 10.

The user terminal 10 may not determine the image ID in the step S22 of the screen information analytical process. Alternatively, although the user terminal 10 can determine an image ID, the image ID-character string correspondence table has no items corresponding to the determined image ID and character, so that the correspondence image data may not exist. In this case, in the step S41, the screen information acquisition module 102 of the support server 100 acquires an icon image and a character from the user terminal 10. The icon image and character are composed of the screen information of the user terminal 10. This image includes the above-described an icon image (for example, the icon images 63 and 64 of FIG. 11) that exist on the screen of the user terminal 10.

Based on the icon image and the character acquired from the user terminal 10, the terminal information output module 103 of the support server 100 sets the icon image and character in a pattern data (Step S42). This pattern data is data that is preliminarily stored in the support server 100, and is also background data in which an icon image and a character are subtracted from screen information displayed on the user terminal 10. Then, data in which the icon image and character are set in the pattern data is sent to the support terminal 150 (Step S43). The support terminal 150 receives this set-in data and displays it as pseudo screen information of the user terminal 10.

Finally, the registration module 105 of the support server 100 assigns a new image ID to the icon image that has been acquired from the user terminal 10 at this time, associates the image ID and the icon image with data for determining the model name, and registers this information (Step S44). The acquisition of data for determining the model name is described hereinafter. Accordingly, the image ID correspondence table can be updated by adding the icon image and the image ID that have not been registered until now. The set-in data may be correspondence image data.

If it takes time to acquire the image, giving speed priority, only character may be acquired from the user terminal 10 and set in the pattern data. In this case, a supporter can infer the screen information that has been displayed in the user terminal 10 from the character.

Correspondence image data in the image ID-character string correspondence table is not stored in the support server 100, so that the screen information that is being displayed on the user terminal 10 cannot be displayed on the support terminal 150. Accordingly, the method of displaying screen information even if the correspondence image data is not stored in the support server 100 will be described hereinafter.

In acquisition of the configuration information of the remote support process, the data acquisition module 101 of the support server 100 acquires data for determining the model name of the user terminal 10. The data for determining the model name may be a serial number, a MAC address, the ID number of a subscriber identity module card (hereinafter referred to as "SIM") card, a phone number, or the like. Then, it is determined whether or not this model is a model registered in the support server 100 based on the data for determining the model name (Step S40). If it is registered (Step S40:"YES"), the above-mentioned process is executed. If it is not registered otherwise (Step S40:"NO"), the process from the step S41 is executed. The step S40 is not shown in FIG. 3. The process from the step S41 is conducted in a similar way to that shown in FIG. 3.

In the step S44, the registration module 105 of the support server 100 assigns the image ID to the icon image that has been acquired from the user terminal 10 at this time, the icon image and the image ID are associated with data for determining the model name, and registers this information. Accordingly, the image ID correspondence table can be updated, and the model name is no longer new next time. Since the image ID is assigned, not sending and receiving of the icon image itself but processing with the image ID enables high-speed processing.

Switching-over Process to Full Remote System

The remote support process (quick remote) as described with reference to FIG. 3 can reduce the load of the data transfer process and conduct the support process at high speed, using a configuration command and an image ID. However, there are requests of a supporter side that screen information being displayed on the user terminal 10 can be viewed directly on the support terminal 150 and that full remote operation can be conducted for the screen directly.

The full remote system is a remote system that conducts a remote service by sequentially sharing screens between terminals. In other words, the screen shot that is being displayed on the user terminal 10 is constantly sent to the support terminal 150 and displayed thereon. Then, the remote operation input from the support terminal 150 is sequentially reflected as operation input of the user terminal 10. In this case, the convenience is improved in that operation conducted by a supporter for the user terminal 10 can be checked. However, the screen shots of screen information displayed on the user terminal 10 needs to be sequentially displayed on the support terminal 150, and the remote operation needs to be reflected in the displayed screen. Thus, there is a problem of increase of throughput of the entire system including the support server 100 and the data traffic.

To solve this problem, the remote support process to the user terminal 10 promptly starts using the quick remote when remote support starts and then switches from the quick remote to the full remote at the time when the full remote is ready. This process will be explained hereinafter.

To execute the full remote system, the user terminal 10 is provided with the screen information sending module 18 that sequentially sends image data of the screen shot that is being displayed on the screen of the user terminal 10 to the support server 100

On the other hand, the support server 100 is provided with the screen information forwarding module 107 that receives image data sent from the user terminal 10 and forwards the image data to the support terminal 150.

In the remote support process of FIG. 3, in the step S01, when the user terminal 10 receives support request from a user, the screen information sending module 18 starts. On the other hand, when the support server 100 receives notification of support request from the user terminal 10, executes the process from the step S02, and starts the screen information forwarding module 107.

When the screen information forwarding module 107 starts but actually does not receive image data from the screen information sending module 18, the screen information forwarding module 107 cannot forward the image to the support terminal 150. Even when the screen information forwarding module 107 receives image data from the user terminal 10, the screen information forwarding module 107 forwards the received image data to the support terminal since image data is sequentially sent from the user terminal 10. Thus, comfortable full remote service cannot be provided. For this reason, the screen information forwarding module 107 receives image data from the user terminal 10, the image data can be sent to the support terminal 150, and checks whether or not the support terminal 150 displays the image data that has sequentially been received. It may be defined that the full remote is ready at the time when the communication band among the user terminal 10, the support server 100, and the support terminal 150 has secured a predetermined capacity.

It often takes a time to start the full remote service due to conduct of such check. Thus, the quick remote described with reference to FIG. 3 doesn't often take a time for such preparation, so that generally a remote support starts before the full remote.

Figure 14:
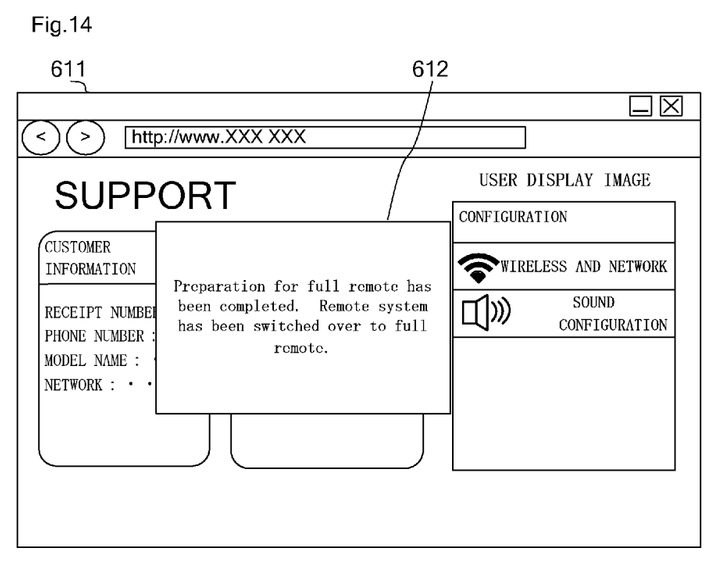
FIG. 14 is a screen image (full remote switched over message) displayed on the support terminal 150.

At a predetermined time after remote support by the quick remote started, the quick remote is stopped and the full remote provides a remote service. This predetermined time may be time when the full remote is ready as described above. Specifically, the command sending module 104 used in the quick remote is automatically stopped at the time when the full remote is ready. Then, the user terminal 10 and the support terminal 150 starts screen sharing in real time, and the shared screen of the user terminal 10 is displayed on the user screen image 158 of the support terminal 150. For remote operation, the full remote starts to receive operation. As shown in FIG. 14, a message for informing switching over to the remote support to a supporter may be displayed.

For example, the quick remote may be automatically switched over to the full remote when the capacity of the communication band is sufficient. In this situation when the user terminal 10 is moved or the like, and then the capacity of the communication band becomes insufficient, the full remote may be switched over to the quick remote.

Logging Process for Private Information

In the user terminal 10, data of the private information such an address book and of trade secrets in business is stored. For this reason, in the remote support process, the data of this private information and the trade secrets may be improperly manipulated through remote operation from the support terminal 150 to the user terminal 10. Even if the manipulation is not intended, a supporter may make a mistake in operation, so that the supporter may delete applications and data that are stored in the user terminal 10.

Figure 15:
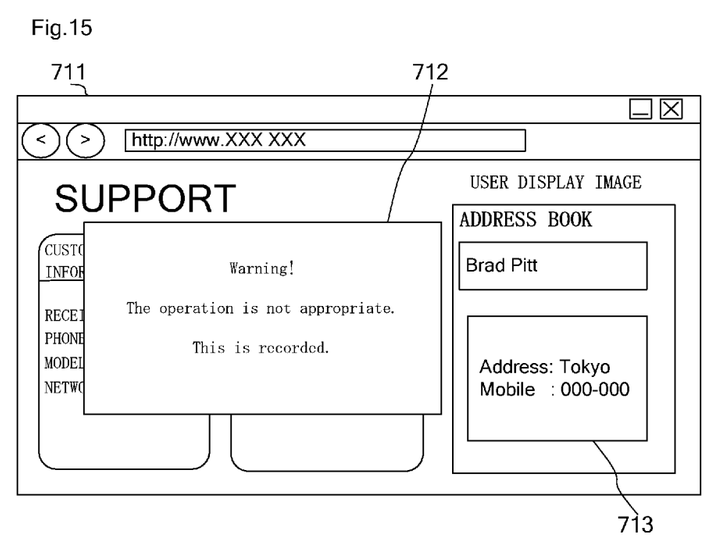
FIG. 15 illustrates a screen image (a message during logging) displayed on the support terminal 150.

For this reason, data (an address book and the like are distinguished with by extension) to be restricted preliminarily for operation from the support terminal 150 to the user terminal 10; and prohibited operation items (not to allow the operation of data "deletion" and the like) should be stored in the support server 100 or the support terminal 150. When a supporter conducts the operation (view or edit) to prohibited data or conducts prohibited operation, the support server 100 or the support terminal 150 detects this, and the logging module 153 of the support server 100 or the support terminal 150 logs this operation as a log. As shown in FIG. 15, when the prohibited operation is conducted (an address book 713 is viewed), an alert message 712 may be displayed on the support terminal 150.

In the quick remote, when the above-mentioned prohibited operation is conducted, it is effective not to generate a configuration command (but not limited to configuration) (Step S07) so as not to conduct command operation based on the operation, in addition to logging.

To achieve the means and functions as described above, a computer (including a CPU, an information processor, and various terminals) reads and executes a predetermined program. For example, a program is provided in forms recorded in a computer-readable record medium such as a flexible disk, a CD (CD-ROM etc.), and a DVD (a DVD-ROM and a DVD-RAM, etc.). In this case, a computer reads a program from a record medium, forwards the program to internal or external storage to store the program therein, and executes the program. For example, the program may be preliminarily recorded in a memory device (a record media) such as a magnetic disk, an optical disk, and a magnetic optical disk, and then provided from the memory device to a computer through a communication line.

The present invention is not what it limits it to these embodiments mentioned above though it explained the embodiment of the present invention. Moreover, it doesn't pass, and the effect of the present invention is not an enumeration of the most suitable effect causing from the present invention in the effect described in the embodiment of the present invention limited to the one described in the embodiment of the present invention.

REFERENCE SIGNS LIST 1 quick remote system
3 public line network
10 user terminal
100 support server
150 support terminal

The invention claimed is:

1. A remote system comprising: a terminal; a remote terminal remotely operating the terminal; and a remote server, wherein
the remote server includes
a data acquisition module acquiring data in response to a remote request from the terminal, the data being stored in the terminal, and notifying the remote terminal,
the remote terminal includes
an operation receiving module receiving a remote operation from a remote operator, the remote operation corresponding to the remote request sent from the terminal, and sending the remote operation to the remote server, and
the remote server also includes
a command sending module sending the remote operation received from the remote operator to the terminal, as a command for conducting the remote operation not by sharing a screen from the remote terminal to the terminal but by operation corresponding to the remote request from the terminal,
wherein the terminal includes a screen information sending module sequentially sending image data of a screen shot to the remote server, the screen shot being displayed on the terminal, and
wherein the remote server includes a screen information forwarding module receiving the sent image data and forwarding the image data to the remote terminal, and at a predetermined time by starting the screen information sending module and the screen information forwarding module, and by sharing a screen in real time from the remote terminal to the terminal, a full remote system conducting remote operation is executed to stop a process of the command sending module.

2. The remote system according to claim 1, wherein the terminal includes
a phase display module displaying, where the remote operation corresponding to the remote request is reflected in the terminal based on a command sent from the command sending module, a user interface to help a user who operates the terminal to conduct operation corresponding to the remote request by her or himself, in a phased manner on the terminal.

3. The remote system according to claim 1, wherein the remote server further includes
a screen information acquisition module acquiring at least one of an image ID and a character from the terminal, the image ID and the character, both corresponding to screen information of the terminal; and
a terminal information output module displaying an image corresponding to at least one of the acquired image ID and the acquired character on the remote terminal.

4. The remote system according to claim 3, wherein
where the screen information acquisition module cannot acquire an image ID corresponding to screen information of the terminal, an image itself corresponding to an image ID that cannot be acquired is acquired from the terminal, and
the terminal information output module uses pattern data preliminarily stored in the remote server and an image acquired from the terminal to display an image corresponding to screen information of the terminal on the remote terminal.

5. The remote system according to claim 1, further comprising a logging module, where the operation receiving module detects remote operation for preliminarily associated prohibition data or prohibited remote operation, logging the remote operation in the remote terminal or the remote server.

6. The remote system according to claim 2, wherein the phase display module includes a redisplay module redisplaying the user interface that was displayed in a phased manner in response to users operation of the terminal.

7. A remote operation method of a remote system comprising: a terminal; and a remote terminal remotely operating the terminal; and a remote server, wherein
the remote server executes the step of
acquiring data in response to a remote request from the terminal, the data being stored in the terminal, and notifying the remote terminal,
the remote terminal executes the step of
receiving remote operation from a remote operator, the remote operation corresponding to the remote request sent from the terminal, and sending the remote operation to the remote server, and
the remote server executes the step of
sending the remote operation received from the remote operator to the terminal, as a command for conducting the remote operation not by sharing a screen from the remote terminal to the terminal but by operation corresponding to the remote request from the terminal,
wherein,
at a predetermined time,
the terminal executes the step of
sequentially sending image data of a screen shot to the remote server, the screen shot being displayed on the terminal, the remote server executes the step of
forwarding module receiving the sent image data and forwarding the image data to the remote terminal, and by sharing an screen in real time from the remote terminal to the terminal, a full remote system conducting remote operation is executed to stop a process that sends a command to the terminal, the command conducting operation corresponding to remote request from the terminal.

8. The remote operation method according to claim 7, wherein the terminal executes the step of
displaying a user interface to help a user who operates the terminal to conduct operation corresponding to the remote request by her or himself, in a phased manner on the terminal, where the remote operators remote operation corresponding to the remote request is reflected in the terminal based on a command sent from the command sending module.

9. The remote operation method according to claim 7, wherein the remote server executes the step of
acquiring at least any one of an image ID and a character from the terminal, the image ID and the character, both corresponding to screen information of the terminal, and
displaying an image corresponding to any one of the acquired image ID and the acquired character on the remote terminal.

10. The remote operation method according to claim 9, wherein
in the acquiring step, where an image ID corresponding to screen information of the terminal cannot be not acquired, an image corresponding to an image ID itself that cannot be acquired is acquired from the terminal; and
in the step of displaying an image on the remote terminal, pattern data preliminarily stored in a remote server and an image acquired from the terminal are used to display an image corresponding to screen information of the terminal on the remote terminal.

11. The remote operation method according to claim 7, wherein in the step of receiving remote operation from a remote operator, where remote operation for preliminarily associated prohibition data or prohibited remote operation is detected, the remote operation is logged in the remote terminal or the remote server.

12. The method according to claim 8,
wherein the terminal is a user terminal,
wherein the remote terminal is a remote support terminal for providing support to a user of the terminal, and
wherein the remote request from the terminal is a request for support for establishing at least one setting of the user terminal.

13. The method according to claim 12, further comprising:
the remote server accessing a configuration command correspondence table that associates the command for conducting the remote operation with configuration phase display data, the configuration phase display data identifying multiple phases for displaying respective configuration windows on the user interface of the terminal;
the remote server sending the scenario data to the terminal;
the terminal executing a first of the multiple phases to display a first configuration window on the user interface of the terminal; and
in response to the user making a selection from the first configuration window displayed on the terminal, the terminal executing a second of the multiple phases to display a second configuration window on the user interface of the terminal.

14. The method according to claim 13, further comprising, in response to a passage of a predetermined time since displaying the second configuration window and without receiving additional operation from the user, the terminal executing a third of the multiple phases to display a third configuration window on the user interface of the terminal.

15. The method according to claim 13, further comprising, by the terminal after executing the second of the multiple phases and in response to a user request:
accessing the configuration phase display data;

re-executing the first of the multiple phases identified in the configuration phase display data to redisplay the first configuration window on the user interface of the terminal; and in response to the user again making a selection from the first configuration window displayed on the terminal, re-executing the second of the multiple phases identified in the configuration phase display data to display the second configuration window on the user interface of the terminal.

* * * * *